Aug. 24, 1926.
F. G. THWAITS
BUMPER
Filed Dec. 19, 1924
1,596,903
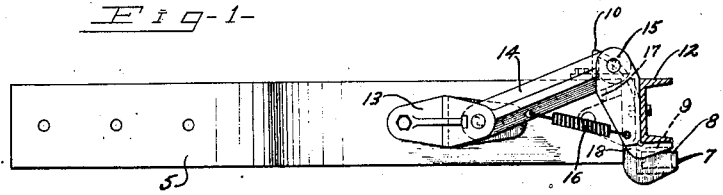
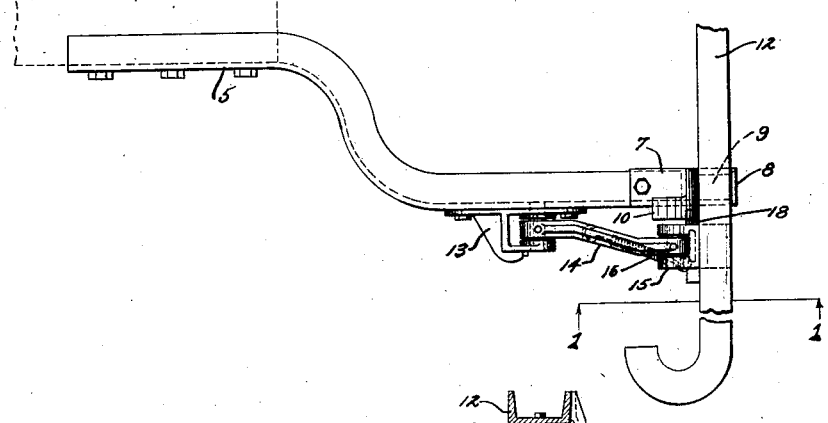
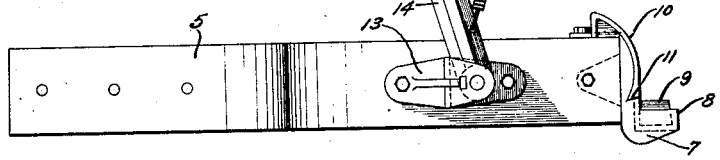
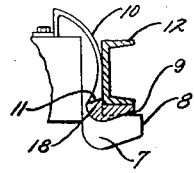
INVENTOR.
Frederick G. Thwaits.
BY
Morsell Keeney & Morsell
ATTORNEY.

Patented Aug. 24, 1926.

1,596,903

UNITED STATES PATENT OFFICE.

FREDERICK G. THWAITS, OF WAUWATOSA, WISCONSIN, ASSIGNOR TO THE HEIL CO., OF MILWAUKEE, WISCONSIN, A CORPORATION OF WISCONSIN.

BUMPER.

Application filed December 19, 1924. Serial No. 756,983.

This invention relates to improvements in bumpers more particularly adapted for motor trucks.

Motor trucks of the tank type for retail trade usually have their discharge faucets at the rear ends of the trucks and unless means are provided for protecting the faucets, and connections and fixtures they are very liable to become broken. Furthermore the ordinary bumpers when used to protect the parts are in the way when it is desired to use the rear portion of the tank.

It is one of the objects of the present invention to overcome the before mentioned objectionable features and provide a bumper constructed to protect the rear portion of a truck and movable to a position to permit easy access to the rear portion of the tank when desired.

A further object of the invention is to provide a novel means for mounting the bumper at the rear end of the truck frame so that when in its lower protecting position it is automatically locked in said position.

A further object of the invention is to provide a bumper which is of simple construction, is strong and durable and well adapted for the purpose described.

With the above and other objects in view the invention consists of the improved bumper and its parts and combinations as set forth in the claims, and all equivalents thereof.

In the accompanying drawing in which the same reference characters indicate the same parts in all of the views:

Fig. 1 is a side view of the improved bumper, parts being in section;

Fig. 2 is a top view of one end portion of the bumper;

Fig. 3 is a side view partly in section, with the bumper bar shown in its upper out of the way position; and Fig. 4 is a sectional detail view thereof.

Referring to the drawing the numeral 5 indicates one of a pair of channel iron attaching arms which are adapted to be mounted on the outer sides of the frame 6 of a truck and curve outwardly and rearwardly therefrom. The rear ends of the arms have angular rest brackets 7 mounted thereon which are formed with rearwardly extending stop sockets 8 provided with rubber stops 9 and also with curved outer side guide flanges 10 which terminate at their lower ends with locking shoulders 11. Said flanges curve upwardly and forwardly to guide the bumper bar 12 to locked position.

Each arm 5 on its outer side and forwardly of its rear end has mounted thereon a bearing bracket 13 to which is pivotally connected a hinge arm 14 adapted to swing rearwardly and downwardly. Each end portion of the bumper bar 12 is also provided with a bracket member 15, rigidly connected thereto and extending upwardly therefrom, which is hinged or pivoted to the free end of the adjacent hinge arm 14. A spring 16 connected to the lower portion of the bracket member 15 and to a medial lower portion of the arm 14 on the outer side of the attaching arm 5 yieldingly holds the bracket member 15 in angular relation to the hinge arm 14 and stop lugs 17 formed on the bracket member 15 and engaging the hinge arm limit the angular relation thereof. Said bracket member 15 at its lower end portion is also provided with a shouldered part 18 which rides downwardly on the curved guide flange 10 and snaps beneath the shoulder 11 to lock the bumper bar in its lower position of use. To release the bumper it is only necessary to pull the bumper bar 12 outwardly against the tension of the springs to disengage the bracket shoulders 18 from the flange shoulders 11 and then swing the bumper upwardly to the position shown in Fig. 3, and when in said position the center of gravity of the bumper is forwardly of its pivotal connections with the bearing brackets 13 and the bumper will remain in its upper position to permit free access to the rear portion of the vehicle to which the bumper is connected.

As the bumper bar 12 when in its lower position bears against the ends of the arms 5 the force of an impact will be transferred directly to the frame of the vehicle.

While only one arm 5 and the adjacent connected together parts are shown and described it will be understood that similar parts are provided for the opposite end of the bumper bar.

From the foregoing description it will be seen that the bumper is of very simple construction and is well adapted for the purpose described.

What I claim as my invention is:

1. The combination with the frame of a motor vehicle, of a bumper therefor, comprising rearwardly extending attaching arms connected to the frame and having locking shoulders, hinge arms pivotally connected to the attaching arms, and a bumper member yieldingly connected to the hinge arms and movable from an upright position to a lower position and in locking engagement with the locking shoulders.

2. The combination with the frame of a motor vehicle, of a bumper therefor, comprising rearwardly extending attaching arms connected to the frame and having locking shoulders, hinge arms pivotally connected to the attaching arms, and a bumper bar pivotally connected to the free ends of the hinge arms and having projections which engage the locking shoulders of the attaching arms when in its lower position, said bumper bar being movable to an upper out of the way position.

3. The combination with the frame of a motor vehicle, of a bumper therefor, comprising rearwardly extending attaching arms connected to the frame and having locking shoulders, hinge arms pivotally connected to the attaching arms, bracket members pivotally connected to the free ends of the hinge arms and having locking projections which engage the locking shoulders of the attaching arms when in their lower position, a bumper bar carried by the bracket members, and means for yieldingly holding the bumper bar in an angular position with relation to the hinge arms.

4. The combination with the frame of a motor vehicle, of a bumper therefor, comprising rearwardly extending attaching arms connected to the frame and having locking shoulders, hinge arms pivotally connected to the attaching arms, bracket members pivotally connected to the free ends of the hinge arms and having locking projections which engage the locking shoulders of the attaching arms when in their lower position, a bumper bar carried by the bracket members, and springs connected to the bracket members and to the hinge arms for yieldingly holding the bracket members in angular position with relation to the hinge arms.

5. The combination with the frame of a motor vehicle, of a bumper therefor, comprising rearwardly extending attaching arms connected to the frame and having bumper supports, guide flanges and locking shoulders, bearing brackets mounted on the outer sides of the attaching arms, hinge arms pivotally connected to the bearing brackets, bracket members pivotally connected to the free ends of the hinge arms and having shoulders which engage the hinge arms and also having locking projections which ride on the guide flanges of the attaching arms and engage the locking shoulders thereof, when said bracket members are in their lower position, a bumper bar connected to the bracket member and movably to a position to rest upon the bumper supports, and coiled springs connected to the bracket members and to the hinge arms for yieldingly holding the said bracket members in angular relation to the hinge arms.

In testimony whereof, I affix my signature.

FREDERICK G. THWAITS.